MULTICHANNEL TIME DELAY SYSTEM EMPLOYING LESS DELAY LINES THAN THE NUMBER OF CHANNELS

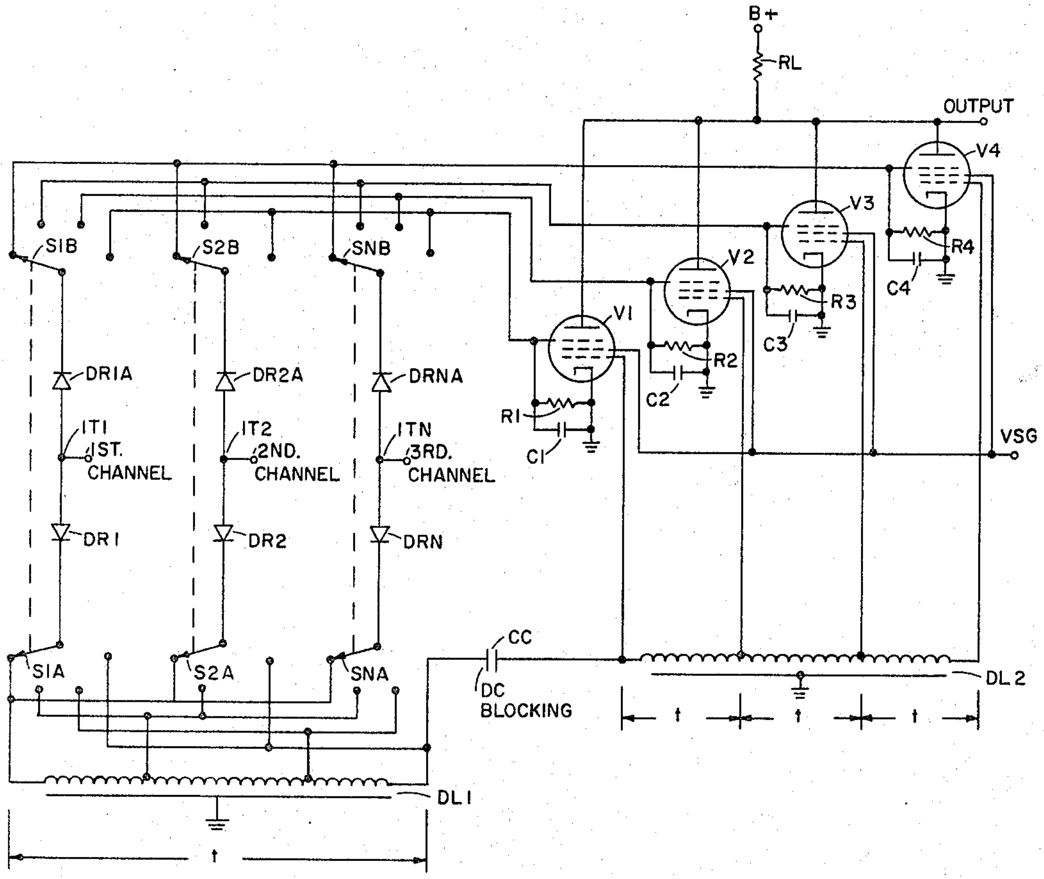
Alexander A. Gorski,
*INVENTOR.*
BY Harry M. Saragovitz
Edward J. Kelly
Herbert Berl
Aubrey J. Dunn 3,382,444

Alexander A. Gorski, Cinnaminson, N.J., assignor, by mesne assignments, to the United States of America as represented by the Secretary of the Army
Filed Oct. 21, 1965, Ser. No. 500,454
4 Claims. (Cl. 328—104)

ABSTRACT OF THE DISCLOSURE

Two tapped delay lines are provided, with the taps of one line connected through switch contacts to the channels. The delay lines are connected together, and the taps of the second line are connected to storage and coincidence circuits. The channels are also connected to the storage and coincidence circuits by additional switch contacts.

Prior art delay circuits for multiple channels have ordinarily required a separate delay circuit for each channel. My invention overcomes this disadvantage and provides a fairly simple circuit for introducing variable amounts of delay in each one of multiple channels using a less number of delay lines than the number of channels to be delayed.

The invention accomplishes the desired result by employing a first tapped delay line having the individual channels connectable to different one of the taps through switches. The pulses from the various channels, after passing through the first delay line, pass through a second tapped delay line which has, connected to its taps, a coincidence circuit for each channel. Another input to the coincidence circuit is provided through additional switches ganged to the switches connected to the taps of the first delay line. The individual coincidence circuits act as output circuits for the various channels.

An object of the invention is to provide a multichannel time delay employing a less number of delay lines than the number of channels.

Another object is to provide a multichannel time delay which is capable of readily providing a variable time delay through a relatively simple switching network.

The invention may be best understood by reference to the drawings, in which the single figure shows the combination of the invention.

In the drawing there is shown a first delay line DL1 and a second delay line DL2. Associated with DL1 is a switching network including rotary switches S1A, S2A, and SNA. Each of the contacts on switches, S1A, S2A, and SNA is connected to a different tap on delay line DL1. Ganged to switches S1A, S2A and SNA are respective rotary switches S1B, S2B and SNB which have contacts connected to suppresssor grids of vacuum V1, V2, V3 and V4. Diodes DR1, DR2, DRN, DR1A, DR2A and DRNA provide isolation between the inputs from the various channels connected to input terminals IT1, IT2 and ITN.

Vacuum tubes V1, V2, V3 and V4 act as coincidence gates and have associated therewith respective integrating networks consisting of the combinations of R1 and C1, R2 and C2, R3 and C3 and R4 and C4. The plate supply for tubes V1–V4 is provided through resistor RL by a voltage source B+, and screen grid voltage is provided at terminal VSG.

The delay line DL1 provides a time delay variable from 0 to T seconds as a function of the setting of switches S1A, S2A and SNA for each channel.

Operation of the circuit is as follows: if a trigger pulse is supplied by the first channel to terminal IT1, it is delayed in DL1 in accord with the setting of S1A. At the same time, the setting of S1B determines which of the integrating networks is charged by the said pulse. As shown, the network R4–C4 of tube V4 would be charged. The pulse fed into DL1 travels along DL1 and is eventually coupled through coupling capacitor CC to delay line DL2. The pulse travels along DL2 and since only one particular tube (V4) is "gated" on through its suppressor grid, only that particular tube will produce an output pulse since that will be the only tube to which a coincident pulse appears on the suppressor and control grids. As can be seen from the drawing, delay line DL1 has a time delay of T and DL2 has a time delay of 3T.

While a specific embodiment of the invention has been disclosed, the following claims are intended to include those modifications and variations that are within the scope of my invention.

I claim:

1. A multichannel time delay including a first delay line having first multiple taps thereon, switching means including first contact means connected to said first taps, a second delay line having second multiple taps thereon and having coincidence means connected to said second multiple taps, said switching means including second contact means connected to said coincidence means, said coincidence means including parallel connected combinations of storage means and input means connected to said second contact means, and means connecting said first and second delay lines.

2. A multichannel time-delay means having a first tapped delay line, first switching means for connecting each of said multiple channels to a selected tap of said first delay line, a second tapped delay line having individual coincidence means connected to each tap thereof, second switching means for selectively connecting each of said multiple channels to a selected coincidence means, and means connecting said first and second delay lines.

3. The time-delay means as defined in claim 2 in which said first and second switching means each include a pair of multiple contact selective switches for each channel.

4. The time-delay means as defined in claim 2, including an output circuit and with each of said coincidence means including an electron discharge device having plural control terminals, an input terminal and an output terminal, said input terminal and said output terminals connected to opposite sides of said output circuit, one of said control terminals connected to said second switching means, and another of said control terminals connected to a respective tap of said second tapped delay line.

References Cited

UNITED STATES PATENTS 3,305,785 2/1967 Carroll ------------- 328—56

OTHER REFERENCES

Pub. I, "Delay Line Adder" by Kean in IBM Technical Disclosure Bulletin, vol. 5, No. 3, August 1962, p. 34.

ARTHUR GAUSS, *Primary Examiner.*

S. D. MILLER, *Assistant Examiner.*